3,272,766
GUM SIMULATING ANATOMICAL MOLDING COMPOSITION

Daniel J. Gowman, Strafford, Pa., assignor to Sartomer Resins, Inc., Essington, Pa., a corporation of Delaware
No Drawing. Filed Dec. 3, 1962, Ser. No. 241,558
2 Claims. (Cl. 260—17)

This invention relates to a novel composition for preparing anatomically colored molded restorations embodying a moldable powder mixture of finely divided solid methacrylate ester polymer, pigment or color, vein-simulating strands of fiber about ⅛ to ¾ inch in length and 2 to 10 denier in weight and as an essential ingredient of said mixture about 1 part to 20 parts of a low viscosity liquid polymeric di lower alkyl siloxane per 1000 parts of said mixture to prevent separation of fibers and pigment during storage and molding use of said composition whereby improved restorations are made.

The composition of the invention is particularly suitable for simulating gum and mouth tissues in the manufacture of dentures and dental plates.

The concept of simulating gum and mouth tissue for dental restorations goes back more than 70 years to patent to Gilbert Walter, U.S. No. 395,600, of London, England, who in 1879 discovered that the natural appearance of the gum tissue can be simulated by a base or plate made of a mixture of differently-colored vulcanized rubber materials, the differently colored rubber materials being in the form of a mixture of colored rubber strings and a fine rubber powder.

During the past 70 years, a great variety of new plastic materials, new fibers and improved colors have become available so that many materials may now be employed to carry out an anatomical restoration of synthetic plastic or cellulosic plastic material. The basic principle of Walker is followed in selecting fine strands of fiber, usually of darker color contrasting with a lighter color synthetic resin menstruum. Such plastic restorations have achieved a high degree of perfection. An example of this type of restoration is found in patent to Erpf, No. 2,497,873, in which an artificial eye comprising a ball or sclera portion is formed of a translucent synthetic resin and there are provided fine strands of rayon fibers on the surface thereof placed by hand to simulate veins with an iris button formed of a transparent synthetic resin, and an extremely thin conjuctiva layer of a transparent synthetic resin applied by dipping or spraying.

This type of restoration is illustrative of a manual operation which must be carried out by highly skilled artists, who need pay closest attention to color matching, color mixing and to the complicated method steps which must be carefully controlled to produce the desired result. In contrast to the materials used by Erpf, the composition of the present invention provides simulated gum tissue as a plastic restoration in which synthetic vein-simulating fibers are randomly interspersed in a body of colored synthetic resin to produce a surprisingly lifelike product of the gum tissue.

In the absence of the essential low viscosity liquid siloxane, preferably DC–200 silicone oil having a viscosity of about 50 cps. at 20° C. which is applied in accordance with the invention to coat the short length textile fibers of the composition, the fibers tend to separate from the acrylic polymer beads and it is not possible to obtain reproducible results. This problem of separating of the fibers has been obviated by the technician in the dental laboratory by packing the mixture of resin beads and fibers in individual portions or units of approximately 30 cubic centimeters in volume. The small units of packing tend to minimize the separation which occurs, but it is inconvenient for the manufacturer to provide the laboratory with such small packages each of which must be color matched to thereby add to the expense and its inconvenience for the technician to first match and then use several packages in order to complete large restorations. Despite these precautions of checking the color match and using small portions, there is still a tendency for the fibers to separate and to produce erratic results leading to dissatisfaction of the patient.

In accordance with the invention it is now practical to package the anatomically colored molding mixture in bulk containers such as one pound and five pound packages in which the fibers are coated with a hydrophobic highly adhered coating of liquid lower alkyl-siloxane polymer to completely eliminate objectionable separation and to assure color matching and uniformity of appearance in the final product.

In a preferred embodiment, the gum-simulating composition of the invention consists of methyl methacrylate polymer pearls having a particle size of from about 50 mesh to 320 mesh and synthetic fibers in an amount of from 1/20% to 1% by weight, preferably 1% to 2% by weight, these fibers being coated with DC–200 silicone. DC–200 silicone has a viscosity of 50 cps. at 20° C. and consists of dimethyl siloxane polymer.

Other lower alkyl liquid polymeric siloxanes may be employed such as diphenyl siloxane liquid polymer, methyl ethyl siloxane liquid polymer, dipropyl siloxane liquid polymer, dibutyl siloxane liquid polymer, phenyl methyl siloxane liquid polymer, etc., the polymers being of sufficiently low molecular weight value to provide a substantially non-volatile liquid polymer having outstanding hydrophobic characteristics.

It is surprising to discover that the lower alkyl siloxane liquid polymer adheres tenaciously to the short length textile fibers, whether these be fibers of vinyl polymers such as vinyl chloride, vinyl chloride-acetate polymer or vinyl chloride-acetate-carboxylic acid or fibers of acrylic polymers such as polyacrylonitrile, acrylonitrile-butadiene copolymer, or polyester fibers such as polyethylene terephthalate or polyamide fibers such as polyhexamethylene adipamide or cellulose fibers such as regenerated viscose rayon, cellulose acetate, cellulose acetobutyrate ethyl cellulose fibers, etc.

The following example is provided to illustrate the invention:

Example 1

The mixture of 98% by weight of methyl methacrylate resin beads and colored cellulose acetate fibers ⅛" to 1¼" in length (random widths) is wetted with the DC–200, e.g., dimethyl siloxane, liquid polymer. The DC–200 is added in the amount of from .1% to 2% by weight which causes the acrylic resin pearls to become immobile rather than free flowing. The mixture is blended in a Patterson-Kelly twin shell blender using an intensifier bar.

If smaller amounts of the composition are to be mixed, these can be suitably blended using a laboratory blender such as a Waring Blendor.

After blending, the mixture was packed to fill a five pound can. Over a period of 8 months samples were taken from this can and used for molding. In no instance was any separation of the fibers from the polymer beads observed in samples from the can for charging into the mold.

A controlled preparation was made in which the siloxane was omitted. In samples of ¼ pound there was a separation of the fibers which came to the top of the mixture. Small portions taken from the sample charged into a mold resulted in a different appearance of the several molded products which could be distinguished visually.

Following conventional pigmenting procedures, the methyl methacrylate pearl polymer was colored with the following types of pigments and mixtures of these for developing the desired tissue color in the finished mass.

Vermilion, a sulfide of mercury, and cadmium red with zinc or titanium oxide produce the desired pink shade. Cadmium yellow is used for deep yellow to orange color. Carbon black and the oxides of iron, zinc or titanium are employed to produce various shades of gray and brown. The burnt and raw umbers and siennas, and the ochres also produce variations in brown shades. Other specific shadings are made using ultra-marine blue and chrome green and yellow. The oxides of zinc or titanium serve as opacifying agents.

For dark-pigmented areas scattered over the pink gum tissue, an esthetic restoration can be produced if to 5 grams of the standard pink resin powder approximately 0.001 to 0.002 gram lamp black, 0.002 gram ultramarine blue, and 0.015 gram burnt sienna are added. The intensity can be varied from deep brown to dark purple by changing slightly the amounts of lamp black and blue.

Fluorescent pigments may be used and dyes which are resistant to bleaching can also be used.

The vein-simulating fibers are also colored with textile dyestuffs which are fast dyes and the dyed fibers are obtained from the manufacturer in the desired color.

While the invention has been particularly shown and described with reference to preferred embodiments thereof, it will be understood by those skilled in the art that various changes in form and details may be made therein without departing from the spirit and scope of the invention.

What is claimed is:

1. A gum-simulating anatomical molding composition having colored vein-simulating fibers incorporated therein which is adapted to be used in the form of moldable resin beads, said composition consisting of a mixture of methyl methacrylate polymer pearls having a particle size of 50 mesh to 320 mesh, 0.05–2.0% by weight thereof of fiber strands from ⅛″ to ¾″ in length, 2 to 20 denier in weight and consisting essentially of a material selected from the group consisting of vinyl chloride homopolymer, vinyl chloride-acetate copolymer, vinyl chloride-vinyl acetate-carboxylic acid copolymer, polyacrylonitrile, acrylonitrilo-butadiene copolymer, polyethylene terephthalate, polyhexamethylene adipamide, regenerated viscose rayon, cellulose acetate, cellulose acetobutyrate and ethyl cellulose and about 1 part to 20 parts of a liquid polymeric di lower alkyl siloxane per 1,000 parts of said mixture to prevent separation of fibers and pigment during storage and molding, the foregoing mixture of siloxane, strands and methyl methacrylate polymer pearls being formed when molded to bear vein-simulating fibers which simulate the veins in natural gum and mouth tissue.

2. A composition as claimed in claim 1, wherein said methyl methacrylate pearl polymer is colored with a pigment.

References Cited by the Examiner
UNITED STATES PATENTS

| | | | |
|---|---|---|---|
| 2,258,218 | 10/1941 | Rochow | 260—827 |
| 2,705,690 | 4/1955 | Nelson et al. | 260—827 |
| 2,792,309 | 5/1957 | Teichmann | 260—827 |
| 2,798,858 | 7/1957 | Brown | 260—827 |

WILLIAM H. SHORT, *Primary Examiner.*

LOUISE P. QUAST, *Examiner.*

J. NORRIS, *Assistant Examiner.*